(12) United States Patent
Reast

(10) Patent No.: US 7,048,287 B2
(45) Date of Patent: May 23, 2006

(54) AIR SUSPENSION ANTI-ROLL STABILIZATION SYSTEM

(75) Inventor: John Bolland Reast, Bromham (GB)

(73) Assignee: Detroit Steel Products Co., Inc., Morristown, IN (US)

( * ) Notice: Subject to any disclaimer, the term of this patent is extended or adjusted under 35 U.S.C. 154(b) by 0 days.

(21) Appl. No.: 10/700,253

(22) Filed: Nov. 3, 2003

(65) Prior Publication Data

US 2004/0100060 A1  May 27, 2004

Related U.S. Application Data

(62) Division of application No. 10/009,600, filed as application No. PCT/GB00/02244 on Jun. 9, 2000, now Pat. No. 6,962,360.

(51) Int. Cl.
*B60G 11/44* (2006.01)
*B60G 11/46* (2006.01)

(52) U.S. Cl. .......... 280/124.107; 280/124.116; 280/124.131; 280/124.166; 280/124.17; 280/124.165; 267/25; 267/32; 267/263

(58) Field of Classification Search ......... 280/124.162, 280/124.163, 124.165, 124.166, 124.17, 280/124.107, 124.116, 124.13, 124.131; 267/25, 260, 263, 31, 32
See application file for complete search history.

(56) References Cited

U.S. PATENT DOCUMENTS

| | | | | |
|---|---|---|---|---|
| 2,582,775 A | * | 1/1952 | Giacosa ..................... 267/190 |
| 3,711,079 A | * | 1/1973 | McJunkin, Jr. ............. 267/188 |
| 3,850,445 A | * | 11/1974 | Borns et al. .......... 280/124.163 |
| 4,181,324 A | * | 1/1980 | Hixon ................. 280/124.102 |
| 4,342,469 A | * | 8/1982 | Corner et al. ......... 280/124.106 |
| 4,718,693 A | * | 1/1988 | Booher ................ 280/124.107 |
| 5,507,516 A | * | 4/1996 | Reast .................. 280/124.106 |
| 5,678,845 A | * | 10/1997 | Stuart ................. 280/124.116 |
| 5,938,221 A | * | 8/1999 | Wilson ................ 280/124.163 |

* cited by examiner

Primary Examiner—Paul N. Dickson
Assistant Examiner—George D. Spisich
(74) Attorney, Agent, or Firm—Fildes & Outland, P.C.

(57) ABSTRACT

An air suspension anti-roll stabilization system includes air suspension devices, such as at least one pair of air bags air spring mounted upon an axle via leaf spring suspension arms of an associated vehicle on respective opposed sides of the longitudinal axis of the vehicle, with the axle being located at least partially with respect to the frame or chassis of the vehicle by means of a pair of leaf spring arms which are located on respective opposed sides of the longitudinal vehicle axis and of which each has one end mounted pivotally to the vehicle frame or chassis, wherein anti-roll means is connected rigidly between the part of longitudinal leaf spring suspension arms.

3 Claims, 13 Drawing Sheets

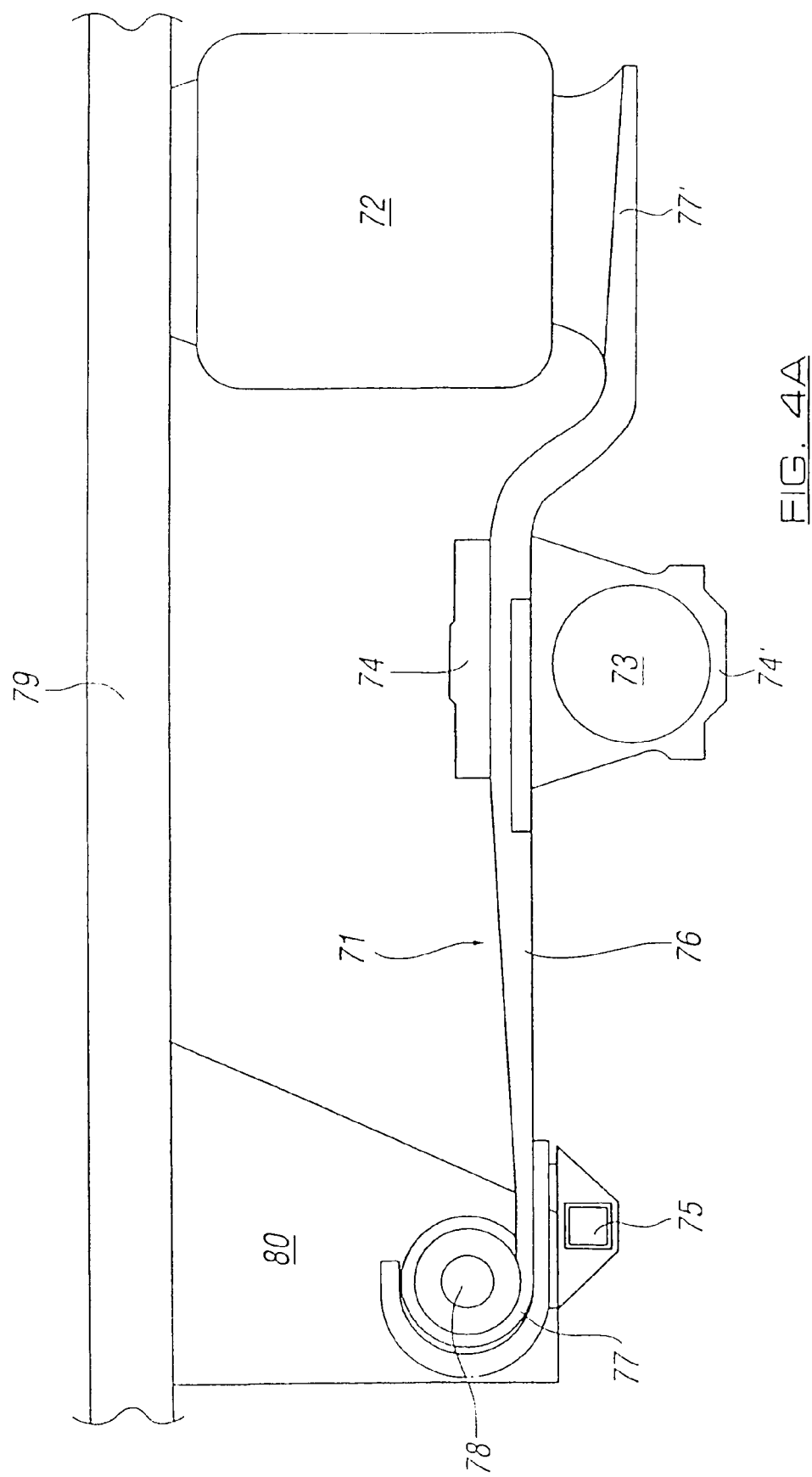

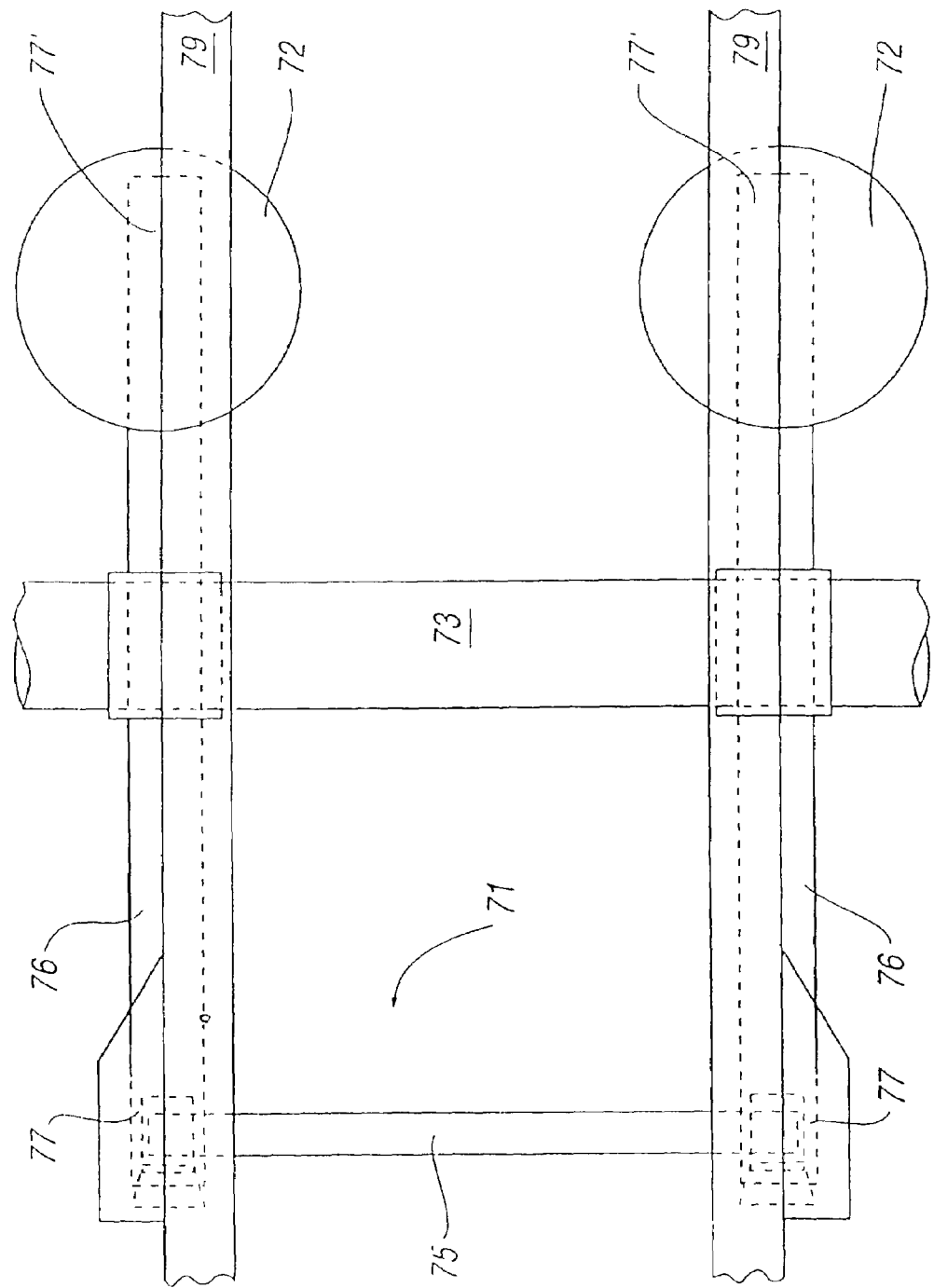

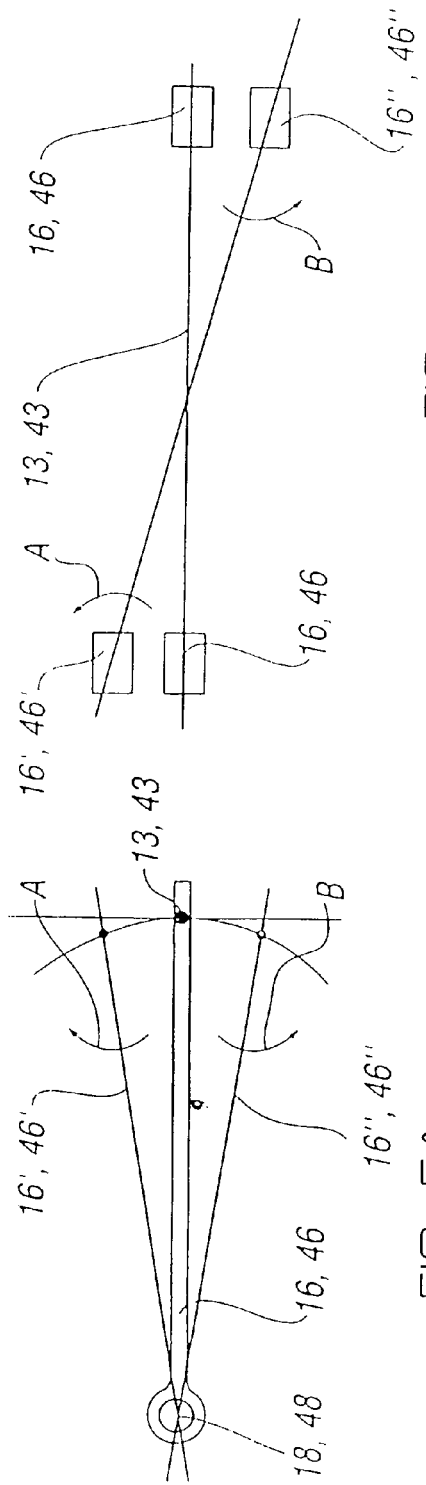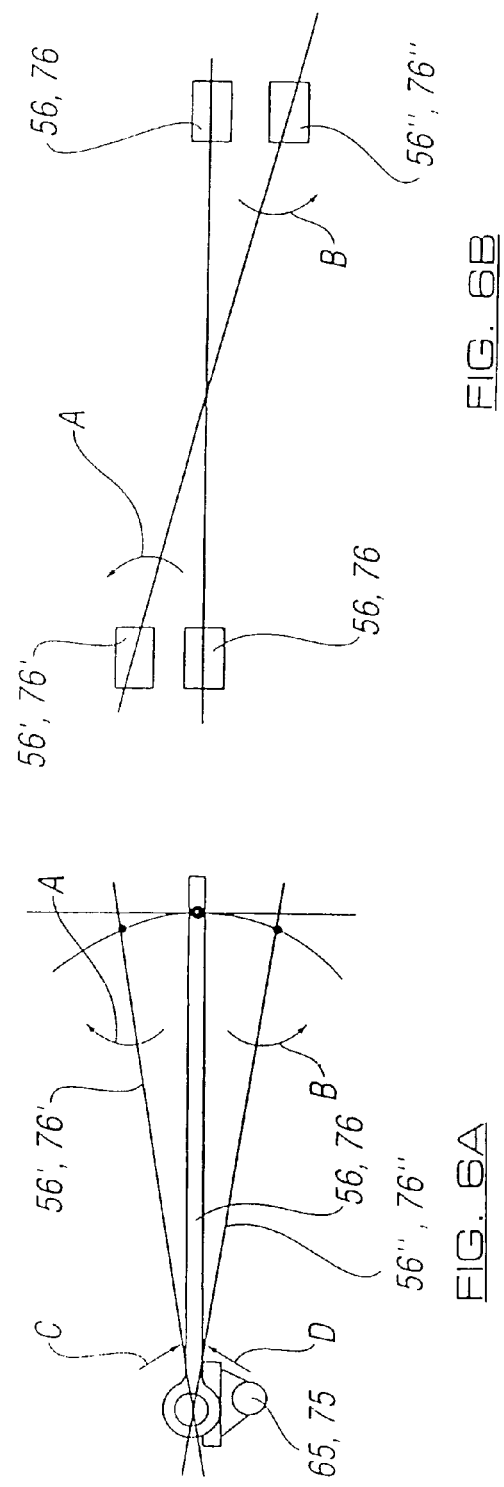

STATIC LOAD

NORMAL MODERATE ROLL
FOR PRIOR ART SYSTEMS

NORMAL MODERATE ROLL FOR
PRIOR ART AND INVENTIVE SYSTEMS

AIR SUSPENSION ANTI-ROLL STABILIZATION SYSTEM

CROSS REFERENCE TO RELATED APPLICATION

This application is a division of U.S. application Ser. No. 10/009,600, filed Dec. 10, 2001 now U.S. Pat. No. 6,962,360, which is the National Phase of PCT/GB00/02244, filed Jun. 9, 2000.

This invention relates to an air suspension anti-roll stabilisation system for vehicles, particularly heavy vehicles, wherein at least one pair of air bags are air spring mounted upon an axle via the leaf spring suspension arms of an associated vehicle on respective opposed sides of the longitudinal axis of the vehicle, with the axle being located at least partially with respect to the frame or chassis of the vehicle by means of a pair of leaf spring arms which are located on respective opposed sides of the longitudinal vehicle axis and of which each has one end mounted pivotally to the vehicle frame or chassis. These longitudinal leaf spring suspension arms are often made of spring steel, although they can also be fabricated from composite materials such as reinforced plastics.

Generally, air suspensions are becoming more popular on vehicles, especially heavy vehicles, such as trucks and buses, to provide a low internal friction, soft ride suspension, without the large height variations associated with steel spring suspensions. Also, by using compressed air as a suspension medium, the vehicle ride heights can be adjusted easily, to suit different vehicle access and operating conditions.

Due to the soft ride and lack of internal friction, air suspension-sprung vehicles usually require considerable extra anti-roll stiffness in addition to the inherent role stiffness provided by the transverse spacing of the air bags or other fundamental air spring units.

In leaf spring type systems where the air bag is not located directly above the axle centre-line, the leaf spring provides some primary spring rate. However, in cases where the air spring is located above the axle centre-line, the leaf spring does not later the primary rate. However, in each case the leaf spring deflection does control the major anti-roll stiffness. The use of leaf spring arms can provide the suspension with more refined ride characteristics during normal straight running, braking or acceleration of an associated vehicle due to the more flexible nature of the leaf spring, provided that the roll stiffness afforded by the arms is sufficient.

Some air suspension systems utilise fabricated beam longitudinal arms. The rigidity of such arms ensures that more flexible and compliant bushes and axle mountings are required to allow for vehicle roll and thus the whole system can give a harsher ride. The amount of flexibility possible in these mountings is limited by the stability of the system under lateral and transverse forces.

Most of the conventional types of air suspension systems use the resistance to roll motions built into the geometry of the system, to provide extra anti-roll stiffness. Thus, as the vehicle rolls, the axle is twisted, the arms are bent and the associated eye bushes (pivot points) are subjected to vertical forces. The respective stiffness of these components of the suspension systems or their associated connections, create extra roll stiffness.

On heavier loaded axles or softer sprung suspensions, this arrangement provides insufficient stiffness or strength to withstand heavier loads, the limitation often being the bending strength or stiffness of the longitudinal suspension arms or the load stress levels at the rigid connections of the axle thereto. In applications which use those arms to locate the axle laterally, the axle connections also have to withstand high transverse bending moments in addition to the anti-roll forces.

Therefore, in many air suspension systems, extra and separate but conventional stabiliser bar systems are required, to provide adequate vehicle anti-roll stability. These additional systems involve considerable additional weight and costs.

A known prior art system with an anti-roll stabilizer bar is shown in FIGS. 1A, 1B and 1C.

A system has been described by MASSER (U.S. Pat. No. 3,140,880), in which air springs are mounted upon longitudinal suspension beams. In this case, due to the inflexibility of the suspension beams, it is necessary to mount the beam upon the axle of the associated vehicle via a resiliently distortable bush, and to mount the arms to a lateral bar by similar bushes, to take-up or absorb shock transmitted through the system. The lateral bar principally provides stability to the suspension beams against transverse or lateral motion and forces acting upon the vehicle. Consequently, the suspension system is cumbersome, heavy and difficult to install whilst adding extra stiffness to the already very stiff system.

Accordingly, it is an object of the present invention to provide an air suspension anti-roll stabilisation system which overcomes, or at least substantially reduces, the disadvantages associated with the known types of system discussed above and which provides a low cost and weight design for incorporating anti-roll stiffness in those known systems. It is a further object of the invention to provide a system which allows for a softening of the leaf spring arms to improve the general ride characteristics of an associated vehicle without either loss or extra roll stiffness.

Accordingly, the present invention is directed to an air suspension anti-roll stabilisation system of the type discussed above but wherein anti-roll means, such as an anti-roll bar or tube, is connected rigidly between the pair of longitudinal leaf spring suspension arms, preferably at or adjacent the points at which the one end of each arm is pivotally attached to the frame or chassis of the associated vehicle.

In this manner, the anti-roll means, which extends transversely of the longitudinal axis of the associated vehicle, has the effect of adding bending stiffness to the longitudinal leaf spring suspension arms during vehicle roll but not during normal straight axle ride motion. When the opposed ends of the anti-roll means are connected rigidly to the longitudinal leaf spring suspension arms at or adjacent the respective pivot points thereof, such an arrangement adds transverse, torsional stiffness close to those pivot points.

Thus, the arrangement of this inventive air suspension anti-roll stabilising system converts the longitudinal leaf spring suspension arms upon which the air bags or other air suspension units are mounted, from acting as beams which are pivotally mounted at their one ends to the frame or chassis of the vehicle, to beams which are fixed or tending towards "encastre" at those one ends, during roll motion of the vehicle. This stiffens the arms in bending, whilst also assisting in the reduction of the resultant bending stresses in those arms.

During vehicle roll, the associated pivot points rotate in opposite directions, whilst in normal, straight axle ride, they rotate in the same direction. Thus, even if there is a rigid torsional connection between the longitudinal leaf spring suspension arms, they retain the pivotal freedom during such normal ride motion. The difference between the fixed end and pivotally jointed deflections of the longitudinal leaf spring suspensions, and the degree of torsional stiffness in the components which interconnect those arms, create the required additional anti-roll resistance during roll deflections whilst allowing full deflection of the leaf spring arms during vehicle non-rolling conditions.

In order that the inventive air suspension anti-roll stabilisation system may be more fully understood, preferred embodiments in accordance therewith will now be described by way of example and comparison with prior art systems and with reference to the accompanying drawings in which:

FIGS. 4A and 4B are respective side elevation and plan views of a second embodiment of inventive air suspension anti-roll stabilisation system;

FIGS. 5A and 5B are respective side and end diagrammatic representations of the movement and stresses in one of the longitudinal suspension arms of the prior art air suspension systems of FIGS. 1 and 2, under compression and extension thereof;

Figure 7A:
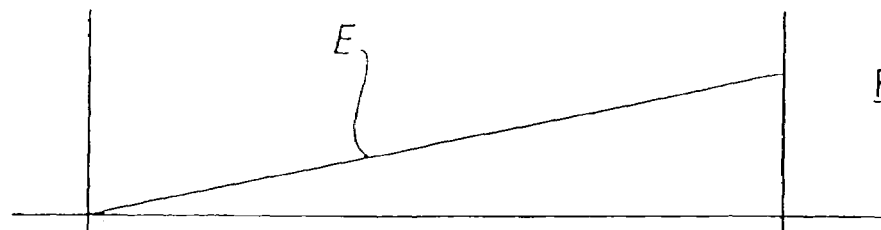
Figure 7B:
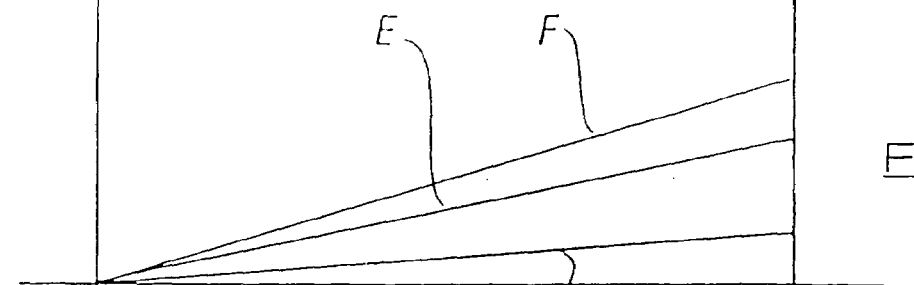
Figure 7C:
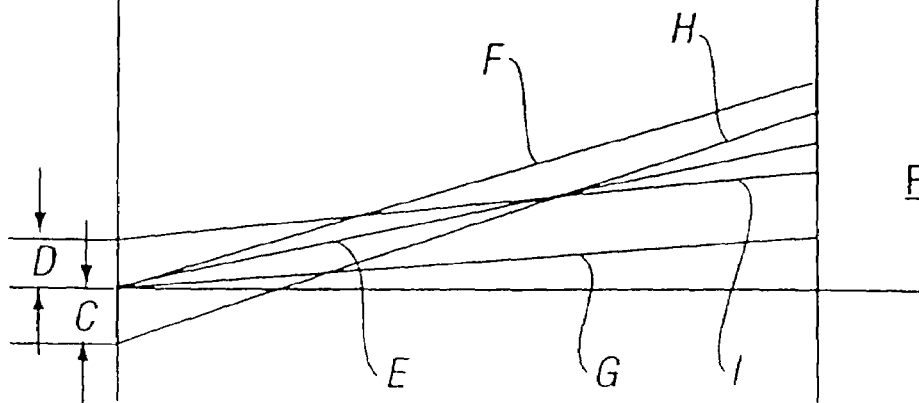
Figure 8:
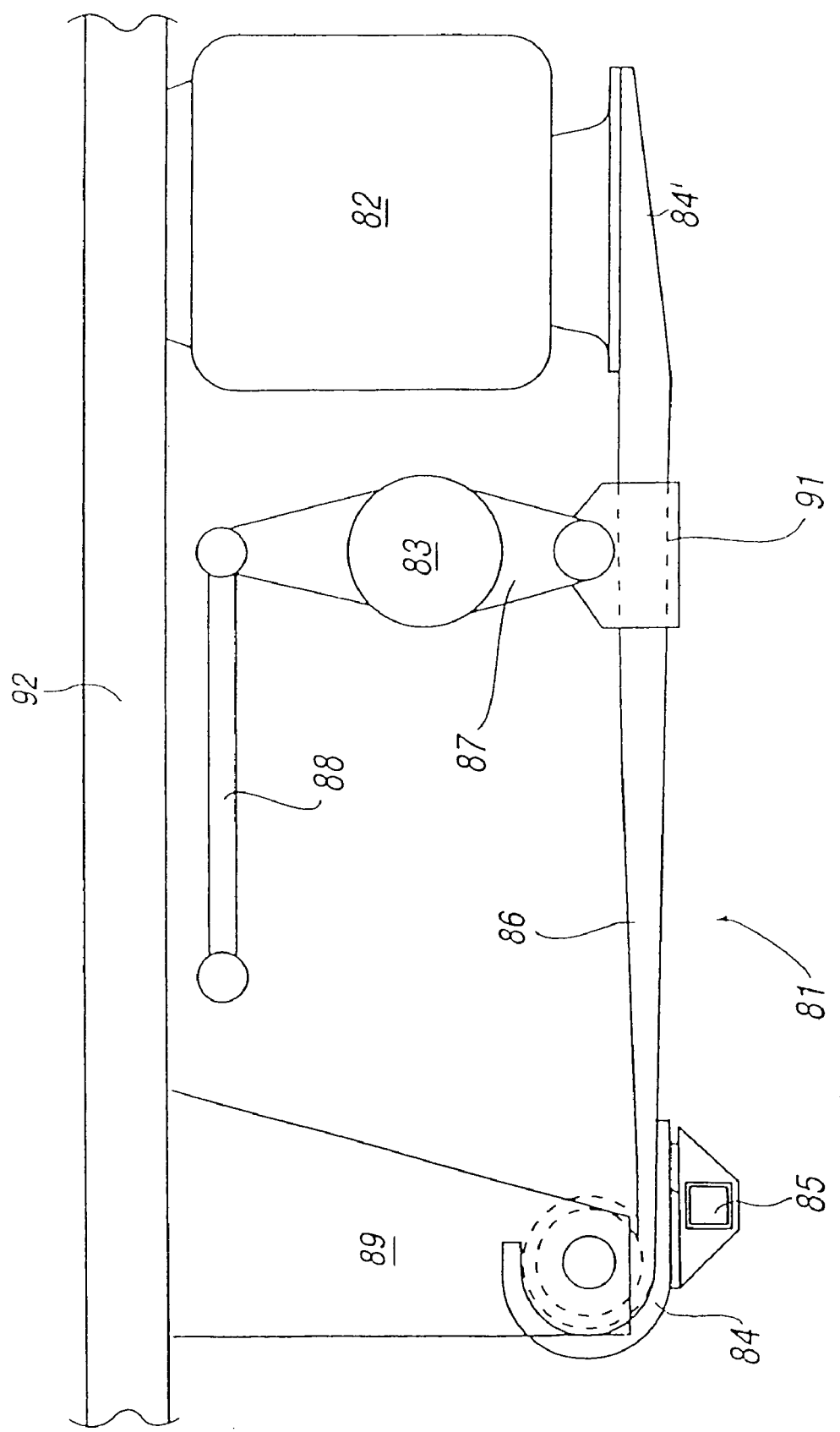
Figure 9A:
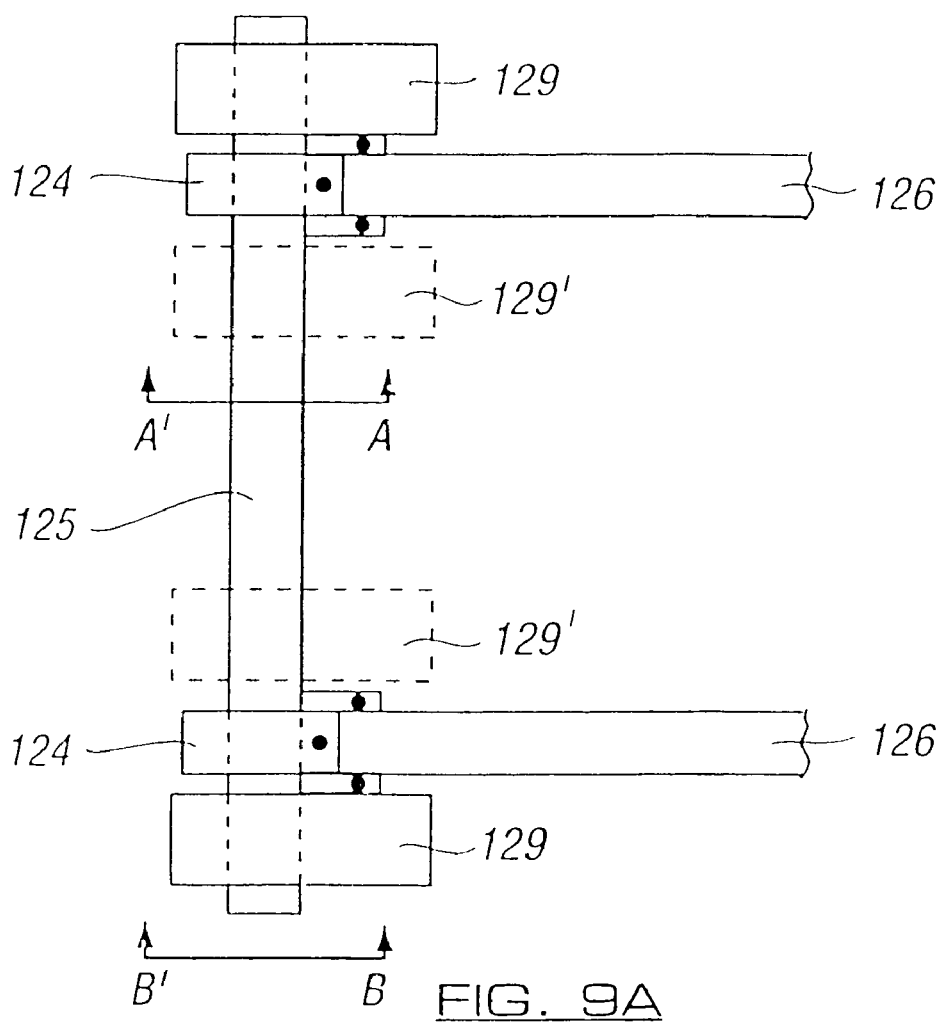
Figure 9B:
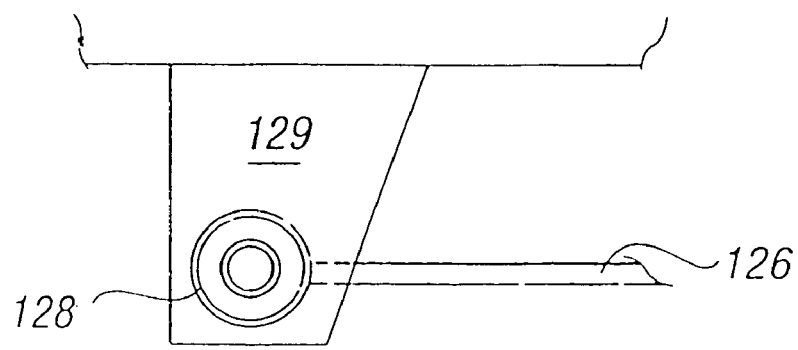
Figure 9C:
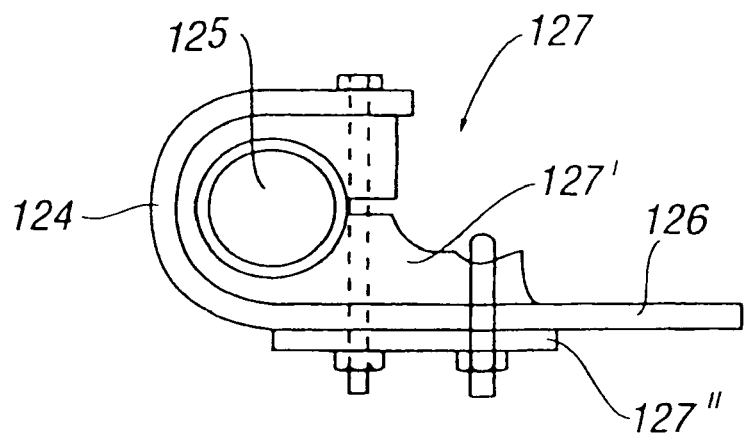
Figure 9D:
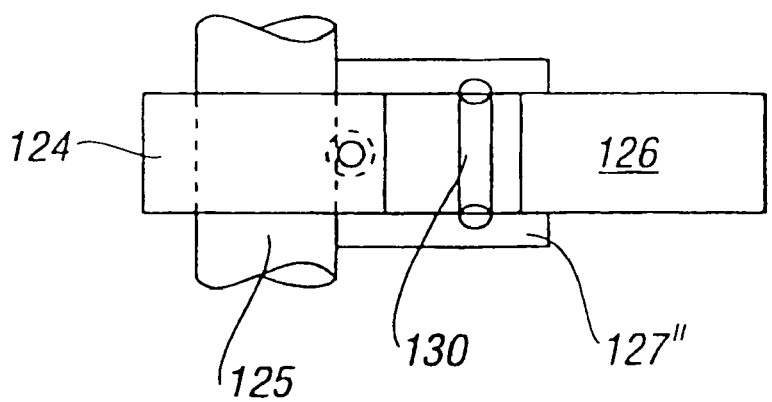
Figure 10:
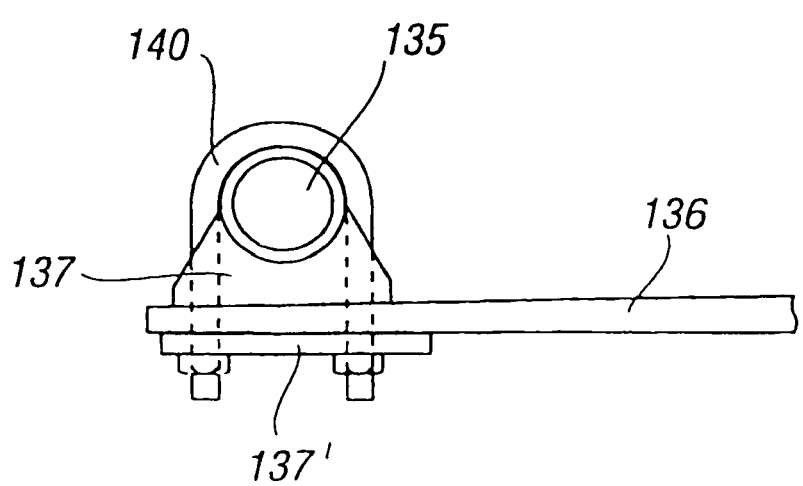

FIGS. 6A and 6B are respective side and end diagrammatic representations of the deflection and moment forces of one of the longitudinal suspension arms of the inventive air suspension systems shown in FIGS. 3 and 4, again under compression and extension thereof; and FIG. 7A is a bending moment diagram for the longitudinal suspension arms of the second form of prior art and inventive air suspension systems of respective FIGS. 2 and 4 under static load;

FIGS. 7B and 7C are respective bending moment diagrams for the longitudinal suspension arms of both forms of prior art and inventive air suspension systems of respective FIGS. 2 and 4 under roll conditions;

FIG. 8 is a side elevation of a third embodiment of inventive anti-roll air suspension stabilisation system;

FIG. 9A is a plan view of a fourth embodiment of inventive air suspension anti-roll stabilisation system, FIGS. 9B and 9C are respective side elevations along lines B'–B and A'–A, and FIG. 9D is a plan view of FIG. 9C; and FIG. 10 is a side elevation of an alternative arrangement of FIG. 9C of inventive air suspension anti-roll stabilisation system.

Figure 1A:
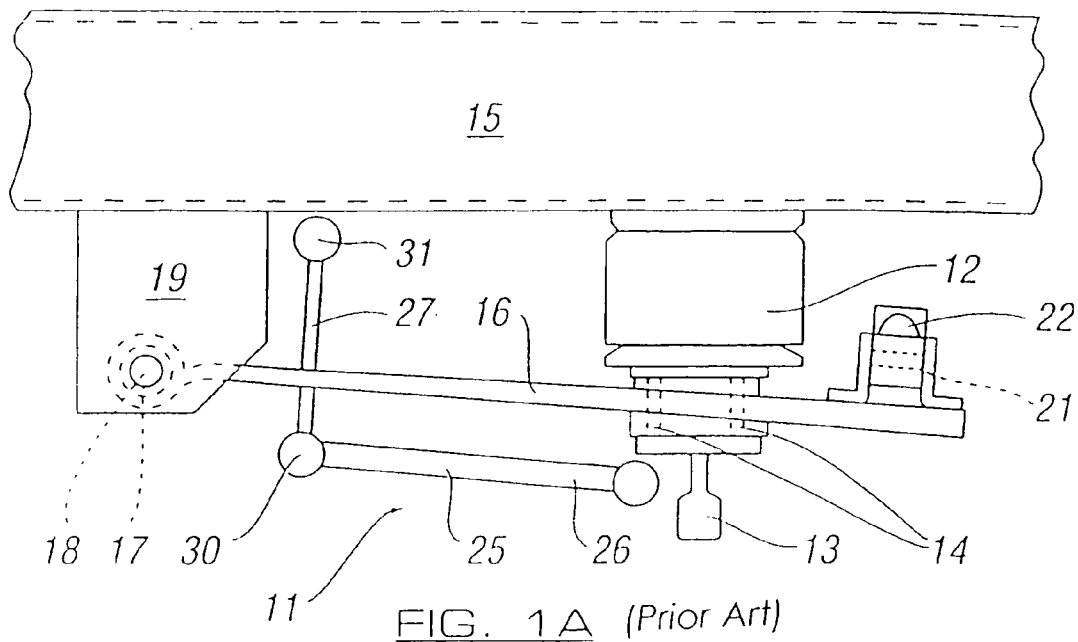
FIGS. 1A, 1B and 1C are respective side, end elevation and plan views of a first form of prior art air suspension system.
Figure 1B:
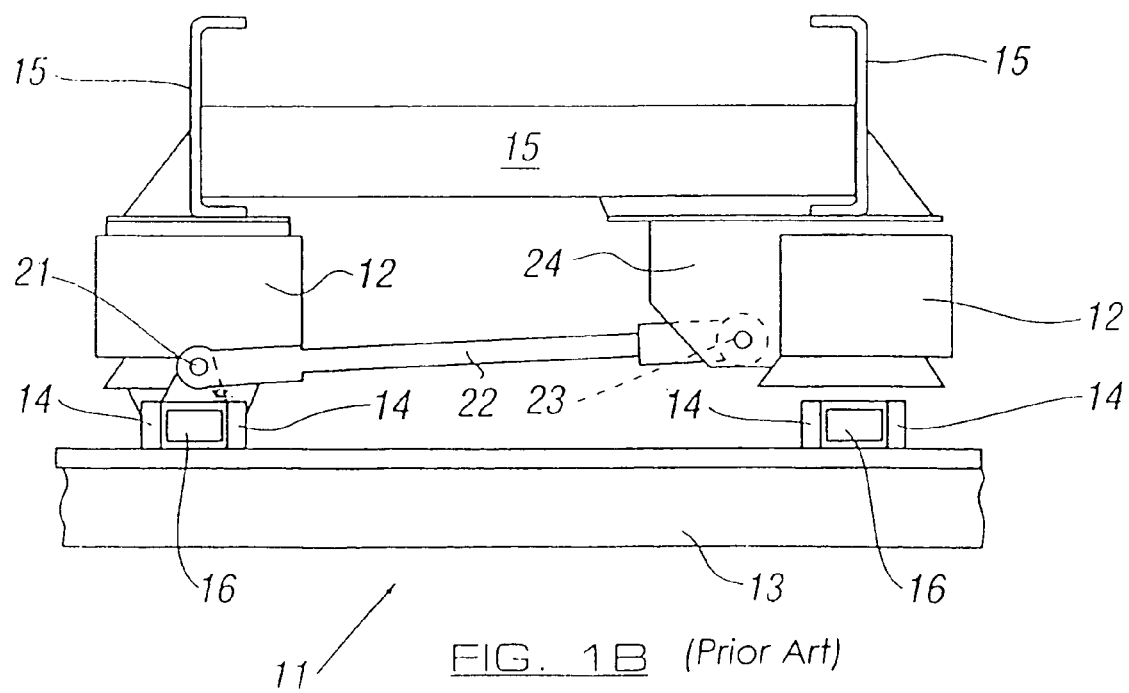
Figure 1C:
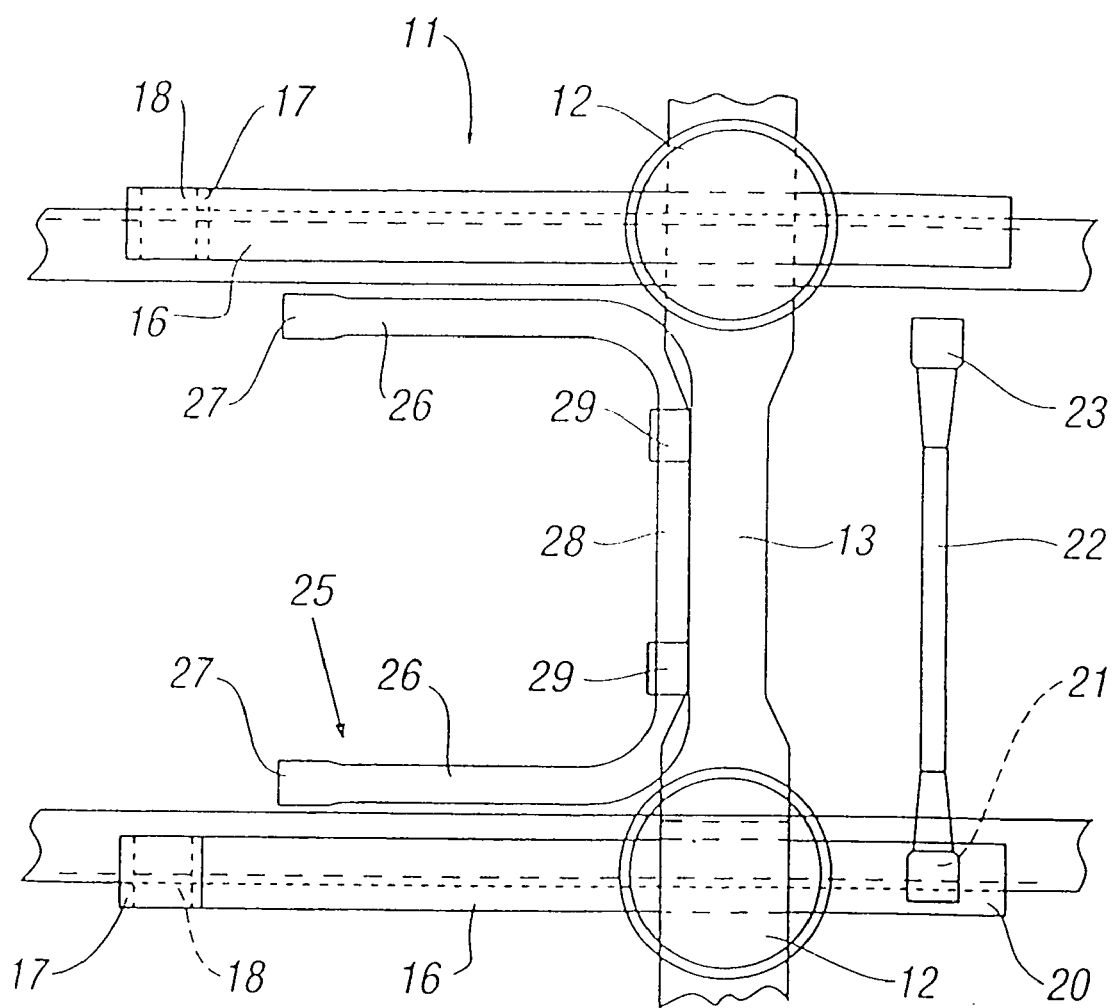

Referring firstly to FIGS. 1A, 1B and 1C, here there is illustrated a prior art air suspension system, indicated generally at 11 and comprising a pair of air bags 12 which are mounted fixedly at 14 to an axle 13 of an associated vehicle on respective opposed sides of the longitudinal axis thereof. The axle 13 is located longitudinally of the frame or chassis 15 of the vehicle by means of the pair of arms 16 which are also located on respective opposed sides of the longitudinal vehicle axis and which extend between the respective air bags 12 and the axle 13, also mounted fixedly thereto at 14.

One end 17 of each longitudinal suspension arm 16 is pivotally mounted at 18 to the vehicle frame 15, or chassis by means of eye bushes (pivot points) 18 attached to a vertical plate or other member 19 which, in turn, is attached rigidly to the vehicle chassis or frame 15.

To the other end 20 of one of the longitudinal suspension arms 16, is pivotally attached, at 21, one end of a lateral location rod 22 whose other end is pivotally attached, at 23, to the vehicle frame or chassis 15 via a vertical bracket 24

Connected between the axle 13 and vehicle frame or chassis 15 is a generally U-shaped stabilising or anti-roll member 25, in known manner. Each arm of the member 25 comprises a generally horizontal portion 26 and a generally vertical portion 27. The base 28 of the U-shaped member 25 is attached pivotally to the axle 13 at locations 29, with the generally horizontal portion 26 thereof being connected pivotally at 30 to the lower end of the generally vertical portion 27, whose upper end 31 is, in turn, connected pivotally at 31 to the vehicle frame or chassis 15.

The prior art air suspension system described above in relation to FIGS. 1A to 1C, has particular application as a suspension system at the forward end of a vehicle, wherein the longitudinal suspension arms 16 are often made of spring steel but can also be fabricated from composite materials, such as reinforced plastics composites. As the air spring 12 is located directly above the axle 13, the leaf spring 16 does not add to the primary rate although if the air spring 12 were to be located offset of the axle 13, as can often happen for reasons of insulation, the leaf spring deflection can add to the primary rate of the system 11.

Figure 2A:
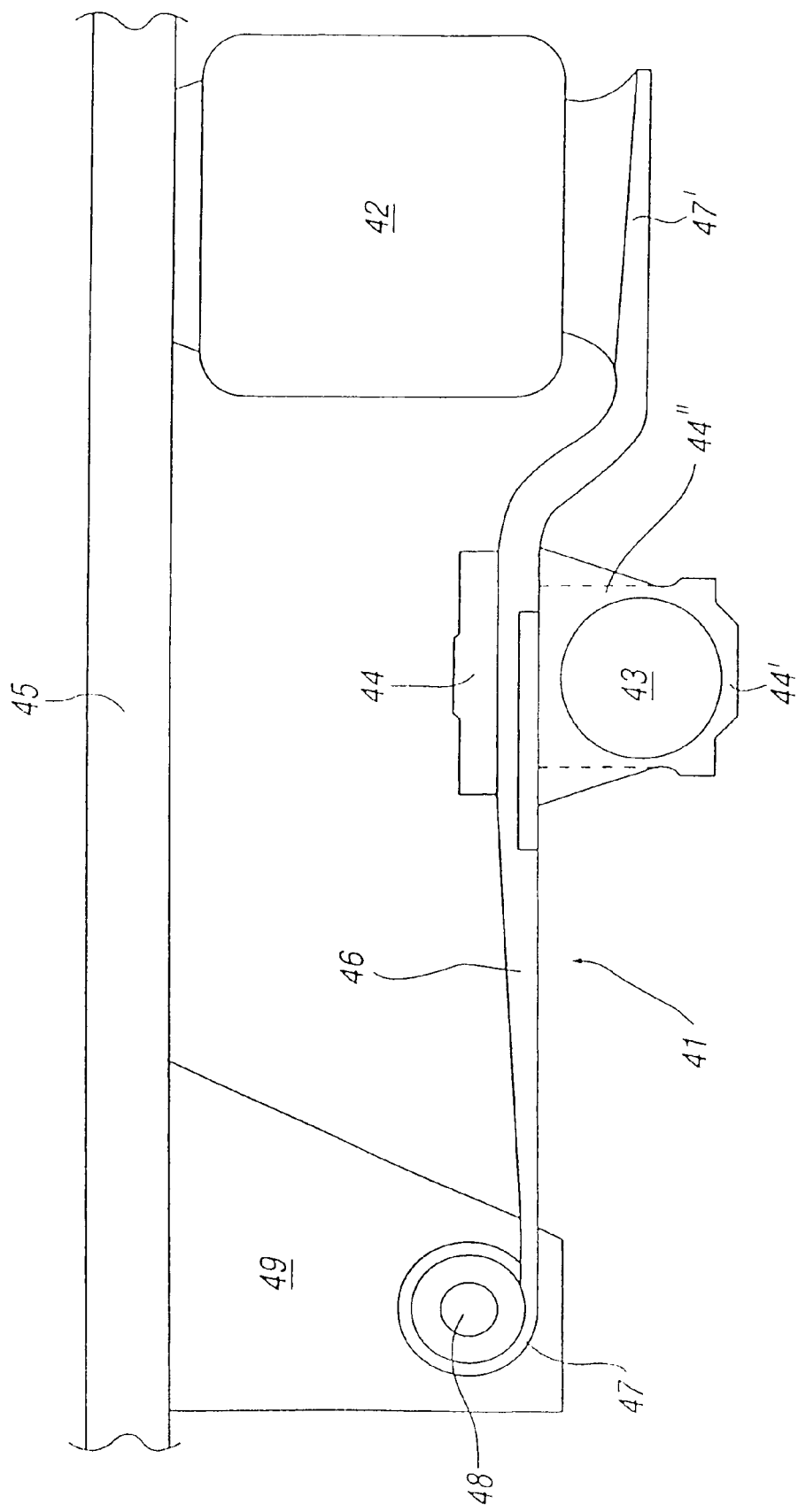
FIGS. 2A and 2B are respective side elevation and plan views of a second form of prior art air suspension system.
Figure 2B:
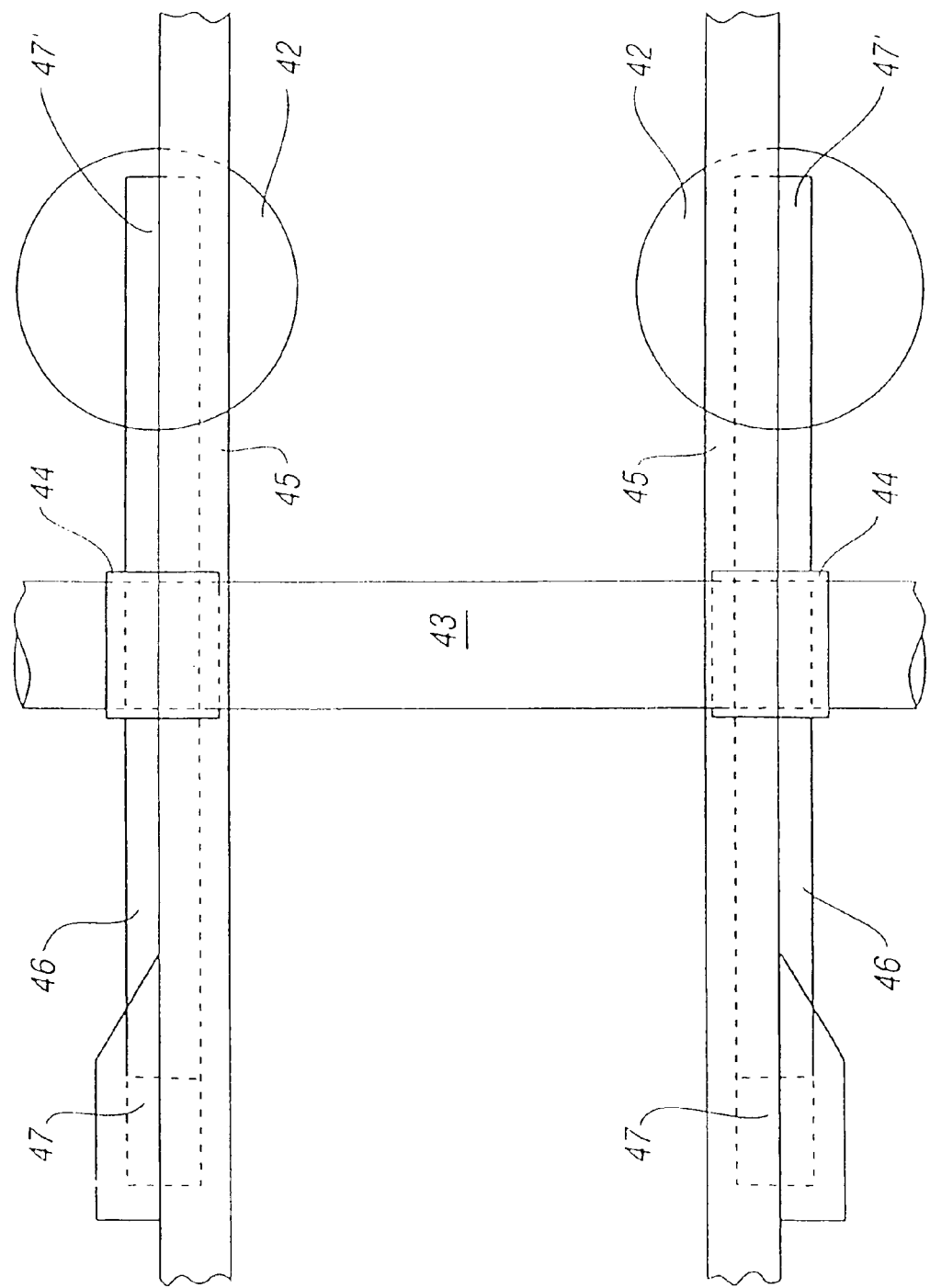

In FIGS. 2A and 2B, there is shown another prior art air suspension system for particular application at the rear end of a vehicle, which comprises a pair of air bags 42 which are mounted upon an axle 43 of an associated vehicle on respective opposed sides of the longitudinal axis thereof, with the axle 43 being located transversely of the frame or chassis 45 of the vehicle by means of a pair of arms 46 which are also located on respective opposed sides of the longitudinal vehicle axis and of which each has one end 47 mounted pivotally at 48 to the vehicle frame or chassis 45 and via a generally vertical bracket 49 whose upper end is secured rigidly to the vehicle frame or chassis 45.

The other end 47' of each longitudinal suspension arm 46 has mounted thereupon the corresponding air bag 42, whilst intermediate those arm ends 47, 47' and generally centrally of the arm 46, is secured rigidly the axle 43 by means of a two-part axle clamp 44, 44'.

A seating 44" for the longitudinal suspension arm 46 is associated with the lower part 44' of the axle clamp.

As already discussed above, because some of the prior art air suspension systems have a soft ride and lack of internal friction, the associated air suspension sprung vehicles usually require considerable extra anti-roll stiffness in addition to the inherent roll stiffness provided by the traverse spacing of the air bags or other fundamental air spring units.

Typically, the prior art air suspension systems described above in relation to FIGS. 1A to 1C and FIGS. 2A and 2B, respectively, use the resistance to vehicle roll motions built into the geometry of the system, to provide at least some extra anti-roll stiffness. Thus, as the associated vehicle rolls, the axle 13, 43 is twisted, the longitudinal suspension arms 16, 46 are bent and the pivot point 18, 48 (eye bushes) at the one end of each arm 16, 46 is subjected to vertical forces. The respective stiffness of these components of the prior art air suspension systems, as well as their associated mechanical connections, provide at least some extra roll stiffness.

With heavier loaded axles 13, 43 or softer sprung suspensions, this extra anti-roll stiffness can be insufficient to withstand such loads. Such limitation is often provided by the bending strength or stiffness of the arms 16, 46 or the local stress levels at the connections of the axles 13, 43 thereto. In particular applications where the arm 46 is located laterally of the axle 43, the associated axle connections also have to withstand high transverse bending moments in addition to the anti-roll forces when not using a lateral location rod such as that shown at 22 in FIGS. 1A to 1C.

Therefore, in some prior art air suspension systems, additional but separate conventional stabiliser means, such as an anti-roll bar or tube, is required to provide adequate anti-roll stability for the associated vehicle. Such a prior art system has been described above in relation to FIGS. 1A to 1C, wherein the generally U-shaped stabiliser (anti-roll means) is provided. However, these extra but separate and pre-formed stabiliser or anti-roll means add considerable weight and cost to the prior art air suspension systems.

Figure 3A:
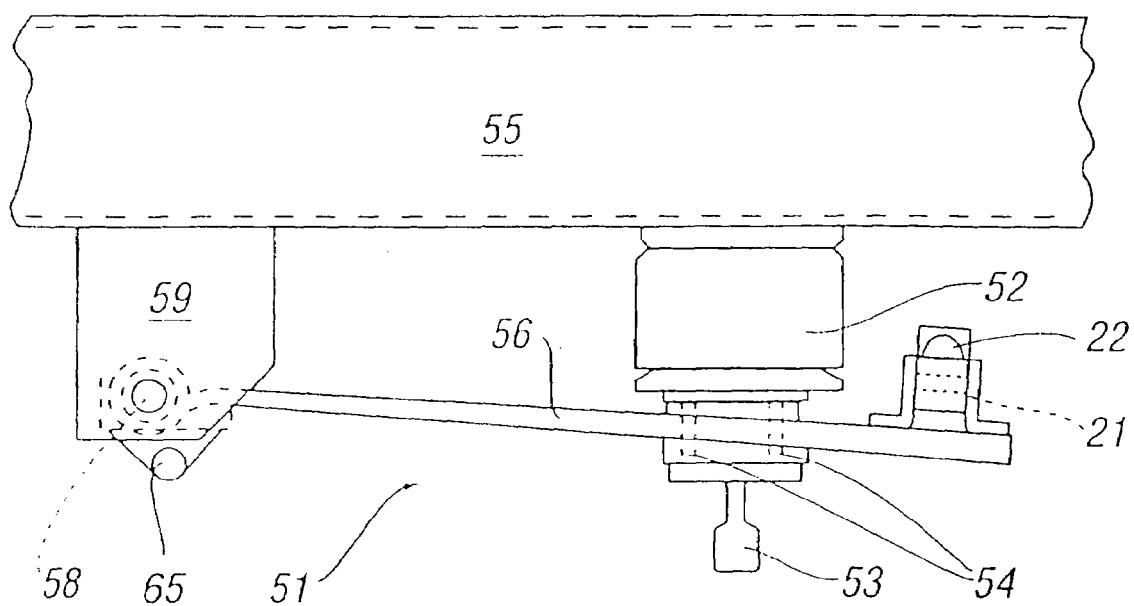
FIGS. 3A and 3B are respective side elevation and plan views of a first embodiment of inventive air suspension anti-roll stabilisation system.
Figure 3B:
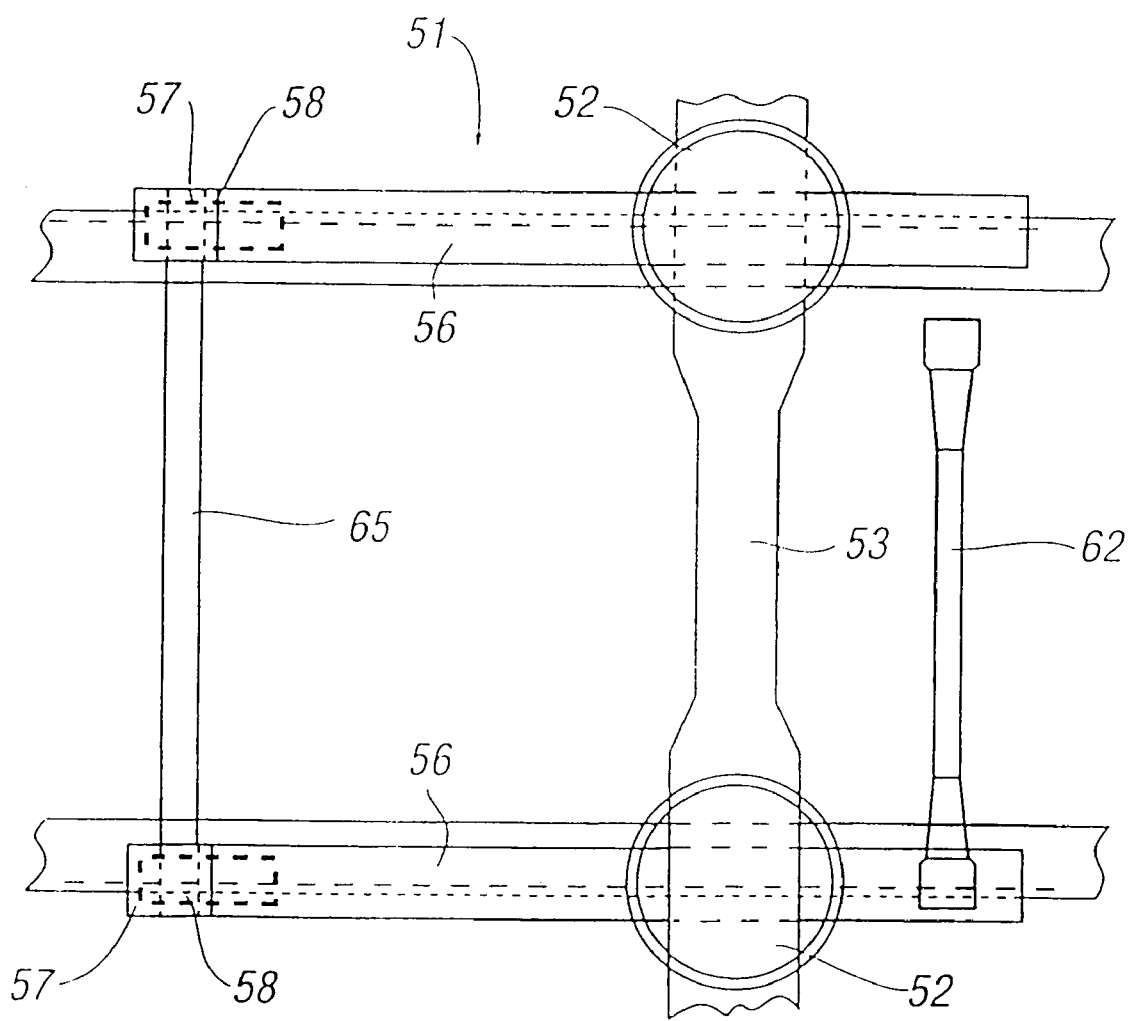

In order to overcome, or at least substantially reduce, these disadvantages associated with prior art air suspension systems, there is provided an inventive air suspension system, such as that shown in FIGS. 3A and 3B, wherein anti-roll means, such as an anti-roll bar or tube, is connected rigidly between the pair of longitudinal suspension arms, preferably at or adjacent the points at which the ends of the arms are attached pivotally to the chassis or frame of the associated vehicle.

Thus, such an improved air suspension system in accordance with the invention will now be described with reference to FIGS. 3A and 3B.

Here, the inventive system 51 is similar to the prior art air suspension system 11 described above in relation to FIGS. 1A to 1C, in that it comprises a pair of air bags 52 which are mounted upon an axle 53 of an associated vehicle on respective opposed sides of the longitudinal axis thereof, with the axle 53 being located transversely of the vehicle frame or chassis 55 by means of a pair of leaf spring arms 56 which are located also on respective opposed sides of the longitudinal vehicle axis and of which each has one end 57 mounted pivotally, for example, by means of an eye bush 58, to the vehicle frame or chassis. Again, a lateral location rod 62 is provided, as in the case of the first prior art air suspension system described above.

However, the inventive air suspension system 51 does not include the add-on, separate and pre-formed anti-roll means 25 of the first form of prior art air suspension system, which, in that system 11, is clamped pivotally between the vehicle frame or chassis 15 and the axle 13.

Instead, a torsional inter-arm connection, in the form of an anti-roll bar or tube 65 is provided. That anti-roll bar or tube 65 is, in accordance with the invention, connected rigidly between the pair of longitudinal leaf spring suspension arms 56, at or adjacent the pivot points (eye bushes) 58 at which the ends 57 of the arms 56 are attached pivotally to the chassis or bore of the associated vehicle.

In this manner, the anti-roll means 65, which extends transversely of the longitudinal axis of the associated vehicle, has the effect of adding bending stiffness to the longitudinal leaf spring suspension arms 56 during vehicle roll. When the opposed ends of the anti-roll bar or tube 65 are connected rigidly to the longitudinal leafspring suspension arms 56 at or adjacent the respective pivot points 58, such an arrangement, in accordance with the invention, and as described above in relation to the first embodiment of air suspension system of FIGS. 3A and 3B, adds transverse, torsional stiffness close to those pivot points 58.

The anti-roll bar or tube 65 of the inventive air suspension system described above with reference to FIGS. 3A and 3B, may be of any suitable section, for example, circular or square.

Referring to FIGS. 4A and 4B, there is shown a second embodiment of inventive air suspension system 71 which is similar to the second form of prior art air suspension system 41 described above with reference to FIG. 2, in that it comprises a pair of air bags 72 mounted upon an axle 73 of an associated vehicle on respective opposed sides of the longitudinal axis thereof. The axle 73 is located transversely of the vehicle frame or chassis 75 by means of a pair of leaf spring arms 76 which are located on respective opposed sides of the longitudinal vehicle axis and of which each has one end 77 mounted pivotally at 78, for example, by means of an eye bush, to the vehicle frame or chassis. As in the case of the second prior art air suspension system 41, described above in relation to FIG. 2, this second embodiment of air suspension system 71 has the one end 77 of each longitudinal suspension arm 76 mounted pivotally to the vehicle frame or chassis 79 by means of, firstly, an eye bush 78 which, in turn is mounted to a generally vertical bracket 80 whose upper region is secured firmly to the vehicle frame or chassis 79.

Similarly, also, each air bag 72 is mounted between the vehicle frame or chassis 79 and the other end 77' of the longitudinal arm 76 thereupon, with the axle 73 clamped securely to an intermediate part of each arm 76 by means of a two-part clamp 74, 74'.

However, this second embodiment of inventive air suspension system 71 is provided with stabilising or anti-roll means in the form of a square cross-sectioned anti-roll bar or tube 75 which is connected rigidly between the pair of longitudinal leaf spring suspension arms 76 at or adjacent the pivot points (eye bushes) 78 at which the one end of each arm 76 is attached pivotally to the vehicle frame or chassis 79.

As in the case of the first embodiment of inventive air suspension system described above in relation to FIG. 3, this anti-roll means, in the form of the anti-roll bar or tube 75, which extends transversely of the longitudinal axis of the associated vehicle, has the effect of adding bending stiffness to the leaf spring longitudinal suspension arms 76 during vehicle roll. When opposed ends of the anti-roll means 75 are connected rigidly to the longitudinal leaf spring suspension arms 76 at or adjacent the respective pivot points 78, such arrangement also adds transverse, torsional stiffness thereat or dose thereto but not under normal axle ride motion.

In FIG. 5A, a longitudinal suspension arm of each prior art air suspension system 11; 41 is shown in the rest or normal position of the suspension system at 16; 46 and in the compressed and extended positions thereof, when the suspension system 11; 41, is subject to roll motions of the associated vehicle, at 16' and 46' and 16" and 46" respectively. The corresponding transverse end view of a pair of longitudinal suspension arms is shown in FIG. 5B, with the axle shown diagrammatically at 13; 43 and the suspension arms 16; 46 at opposed ends thereof.

In these prior art arrangements, the resistance to roll motions built into the geometry of the air suspension systems 11; 41, is shown by respective arrows A and B in compression and extension of the system, respectively.

Thus, as the vehicle rolls, the axle 13; 43 is twisted and the longitudinal suspension arms 16; 46 are bent and the eye bushes 18; 48 are subjected to vertical forces. The respective stiffness of these components of the prior art suspension systems 11; 41, and/or their associated connections, create extra roll stiffness.

However, on heavier loaded axles or softer sprung suspensions, this arrangement has insufficient stiffness or strength to withstand such heavier loads. This limitation is often the bending strength or stiffness of the arms 16; 46 or the local stress levels at the corresponding axle connections.

On applications which use the arms 16; 46 to locate the axle laterally with respect to the vehicle, the axle connections also have to withstand high transverse bending moments in addition to the anti-roll forces.

With the presently inventive air suspension systems 51; 71 additional transverse, torsional stiffness is provided by the anti-roll means, such as the anti-roll bar or tube 65; 75 discussed above in relation to FIGS. 3 and 4, which is connected rigidly between the pair of longitudinal suspension arms 56; 76. Thus, such an inventive arrangement, with the longitudinal suspension arms 56; 76 in positions corresponding to those shown and discussed above in relation to the prior art suspensions 11,41 of FIGS. 5A and 5B, namely, in compression and extension at 56', 76' and 56", 76", respectively, an additional torsional resistance is provided for the suspension 51; 71 as indicated by the arrows C and D respectively, as shown in FIGS. 6A and 6B.

FIG. 7A is a bending moment diagram for the arms 46 and 76 between the pivot points 48 and 78 and the respective axles 43 and 73, the corresponding bending stress in each of the longitudinal suspension arms 46 and 76 of the prior art and inventive suspension systems 41 and 71 at static load being shown by the line graph E.

In FIG. 7B, which is a bending moment diagram for the arms 46 of the prior art suspension system 41 between the pivot points 48 and the angle 43, that static bending stress is also shown by the graph E but for the prior art suspension system 41, the corresponding bending stresses under compression and extension at normal, moderate roll conditions of the associated vehicle are shown at F and G, respectively.

In FIG. 7C, which is a bending moment diagram for the arms 46 and 76 between the pivot points 48 and 78 and the respective angles 43 and 73, of both the prior art and inventive suspension systems 41 and 71, the corresponding bending stresses for static and normal moderate roll conditions for the prior art system 41 are again shown at E, F and G. However, with the inventive suspension systems 71 the corresponding line graphs of the bending stresses in the longitudinal suspension arms 76 under compression and extension, are shown by the line graphs H and I, respectively.

Thus, it can be seen that in inventive air suspension systems 51; 71 the provision of the anti-roll means 65; 75 connected between the longitudinal suspension arms 56; 76 at or adjacent the associated pivot points (eye bushes) 58; 78 converts the arms from acting as beams which are jointed pivotally to the vehicle frame or chassis, as in the prior art suspension systems 11; 41 discussed above, to beams which are fixed or encastre during roll motions of the vehicle. In this manner, the longitudinal leaf spring suspension arms 56; 76 of the inventive air suspension systems 51; 71 are stiffened in bending, thereby assisting in the reduction of associated bending stresses in those arms.

As discussed above, during roll motions of the associated vehicle, the pivot points rotate in opposite directions and in normal straight axle ride, they rotate in the same direction. Thus, even if there is a rigid torsion connection between the longitudinal leaf spring suspension arms 56; 76, such as that provided by the inventive suspension systems 51; 71, the arms 56; 76 retain their pivotal freedom during this normal ride motion.

As can be seen from the line graphs of FIG. 7C, the difference between the fixed end and pivotally jointed deflections of the longitudinal suspension arms, and the degree of torsional stiffness in the components which interconnect the arms, create additional anti-roll resistance, during roll motions of the vehicle and corresponding deflections of the suspension systems and reduce the bending stresses in the arms.

Referring now to FIG. 8, there is shown, generally indicated at 81, a further embodiment of inventive suspension system, wherein the axle 83 is secured to the leaf spring suspension arm 86 by a bracket 87 and clamp 91 provided with an axle bush. An air spring 82 is provided at an end 84' of the suspension arm 86 and at the other end thereof 84 the arm is connected to a bracket 89 through which attachment to the chassis or frame 92 is effected. The axle 83 is further provided with an upper axle control arm 88 to afford the vehicle extra stability under braking and traction.

In accordance with the invention, the system 81 is provided with anti-roll means 85 rigidly connected between a pair of arms 86. Such rigid connection has the effect of adding bending stiffness to the leaf spring longitudinal suspension arms 86 during vehicle roll. When opposed ends of the anti-roll means 85 are connected rigidly to the longitudinal leaf spring suspension arms 86 at or adjacent the respective pivot points 88, such arrangement also adds transverse, torsional stiffness thereat or close thereto but not under normal axle ride motion.

Referring to FIGS. 9A to 9D, the U-shaped ends 124 of a pair of leaf spring arms 126 are shown. An anti-roll bar or tube 125 is clamped into the U-shaped portion 124 by virtue of a clamping bracket 127 with upper 127' and lower 127" portions. The upper portion 127' fits into the U-shaped end 124 of the spring arm and is provided with a transverse through bore to accommodate the anti-roll bar or tube 125. The upper portion 127' is further provided with a vertical through bore to accept the thread of a bolt, and has also a horizontal split in a direction running from the transverse through bore longitudinally toward the centre of the spring arm 126. The opposed legs of the U-shaped portion 124 is provided with vertical through bores which mate with the vertical bore of the upper portion 127'. A bolt is placed through the mating vertical bores and thereby protrudes dependently from the lower leg of the U-shaped portion of the spring arm 126. The lower portion 127" is also provided with a through bore through which the depending portion of the bolt is placed. A nut is then used to clampingly secure the anti-roll bar 126 in place in the U-shaped portion 124 of the spring arm 126. A further U-shaped bracket, or U-bolt, 130 is utilised to rigidly clamp the upper 127' and lower 127" portions of the clamping bracket 127.

Referring to FIG. 9B, the vertical bracket 129 is provided with a pivot point 128 (an eye bush) through which it is connected to the anti-roll bar or tube 125. The bracket 129' may alternatively be located internally of the spring arm 126 to thereby reduce the width of the suspension system.

FIG. 10 shows an alternative way of clamping the spring arm 136, wherein a bracket 137 supports the anti-roll bar or tube 135. A U-shaped clamping member 140 clamps the anti-roll bar or tube 135, through apertures in the spring arm 135, to a lower bracket portion 137' where it is held in place by virtue of nuts which engage threaded portions of the clamping member 140. Alternatively, a pair of members 140 may secure the tube 135 to the arm such that each is disposed about opposite sides of the arm 135 and clamps to a lower bracket portion 137'.

Whilst the above embodiments, and the Figures, show the anti-roll bar as being of square cross-section, this is not absolute. For example, an anti-roll means, such as a bar or tube, can be of circular cross-section or, indeed, any other torsionally stiff construction.

All of the inventive embodiments may be used on suspension systems which are utilised in either front of rear wheel suspension systems and all provide a low weight method of increasing the stability of air suspension systems whilst allowing for improved ride characteristics by using softer leaf spring arms.

What is claimed is:

1. An air suspension anti-roll stabilization system comprising air suspension means of at least two air bags mounted upon an axle via respective leaf spring suspension arms of an associated vehicle on respective opposed sides of a longitudinal axis of the vehicle, with the axle being located at least partially with respect to a frame or chassis of the vehicle by means of said leaf spring suspension arms which are located on respective opposed sides of the longitudinal vehicle axis and of which each has one end mounted pivotally to the vehicle frame or chassis by means of anti-roll means, wherein said anti-roll means is of a generally straight shape, is connected rigidly and directly between the pair of longitudinal leaf spring suspension arms and is connected pivotally at each end to the vehicle frame or chassis; and wherein the longitudinal suspension arms upon which the air bags are mounted act as beams which are pivotally mounted at their one ends to the vehicle frame or chassis by means of said anti-roll means during normal vehicle motion and which are caused to act as beams which are fixed or tending towards being fixed at their pivotally connected ends by said anti-roll means during roll motion of the vehicle.

2. A system according to claim 1, wherein said anti-roll means is connected between connection points corresponding to points at which the one end of each suspension arm is pivotally mounted to the frame or chassis by the anti-roll means, such that said anti-roll means adds transverse, torsional stiffness to the suspension arms at the connection points during vehicle roll.

3. A system according to claim 1, wherein said anti-roll means comprises an anti-roll bar or tube.

* * * * *